US010766136B1

(12) United States Patent
Porter et al.

(10) Patent No.: US 10,766,136 B1
(45) Date of Patent: Sep. 8, 2020

(54) ARTIFICIAL INTELLIGENCE SYSTEM FOR MODELING AND EVALUATING ROBOTIC SUCCESS AT TASK PERFORMANCE

(71) Applicant: Amazon Technologies, Inc., Seattle, WA (US)

(72) Inventors: Brandon William Porter, Yarrow Point, WA (US); Leonardo Ruggiero Bachega, Seattle, WA (US); Brian C. Beckman, Seattle, WA (US); Benjamin Lev Snyder, Seattl, WA (US); Michael Vogelsong, Seattle, WA (US); Corrinne Yu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 48 days.

(21) Appl. No.: 15/803,610

(22) Filed: Nov. 3, 2017

(51) Int. Cl.
B25J 9/16 (2006.01)
G06N 3/08 (2006.01)
G06N 3/04 (2006.01)

(52) U.S. Cl.
CPC ............ B25J 9/163 (2013.01); B25J 9/1697 (2013.01); G06N 3/04 (2013.01); G06N 3/08 (2013.01); G05B 2219/39271 (2013.01); Y10S 901/03 (2013.01); Y10S 901/47 (2013.01)

(58) Field of Classification Search
CPC .......... B25J 9/163; G25J 9/1697; G06N 3/04; G06N 3/08
See application file for complete search history.

(56) References Cited

U.S. PATENT DOCUMENTS

2015/0310308 A1 10/2015 Xiong et al.

OTHER PUBLICATIONS

G.D. Hager; Wen-Chung Chang; A.S. Morse. "Robot Feedback Control Based on Stereo Vision: Towards Calibration-Free Hand-EYe Coordination" 1994 [Online] Downlaoded Feb. 14, 2018 https://ieeexplore.ieee.org/stamp/stamp.jsp?tp=&arnumber=350907.*
Yann Lecun, Koray Kavukcuoglu, and Clement Farabet. "Convolutional Networks and Applications in Vision" IEEE 2010 [Online] Downloaded Feb. 14, 2019 https://ieeexplore.ieee.org/stamp/stamp.jsp?tp=&arnurnber=5537907.*
Kasper Althoefer et al "Reinforcement Learning in a rule-based navigator for robotic manipulators" 2001 [Online] Downloaded Feb. 14, 2019 https://ac.els-cdn.com/S0925231200003076/1-s2.0-S0925231200003076-main.pdf?_tid=fc9c1845-2616-4260-913d-c92f426f71e1&acdnat=1550176228_4f7e0417834e64aced85aa7f77484a21.*
Tom Botterill, Steven Mills, and Richard Green. "Speeded-up Bag-of-words Algorithm for Robot Localisation through Scene Recognition" IEEE 2008 [Online] Downloaded Feb. 14, 2019.*
Timothy P. Lillicrap et al "Continuous Control with Deep Reinforcement Learning" Feb. 2016 [Online] Downloaded Feb. 14, 2019https://arxiv.org/pdf/1509.02971.pdf.*

(Continued)

Primary Examiner — Ben M Rifkin
(74) Attorney, Agent, or Firm — Knobbe, Martens, Olson & Bear, LLP

(57) ABSTRACT

A machine learning system builds and uses computer models for identifying how to evaluate the level of success reflected in a recorded observation of a task. Such computer models may be used to generate a policy for controlling a robotic system performing the task. The computer models can also be used to evaluate robotic task performance and provide feedback for recalibrating the robotic control policy.

15 Claims, 6 Drawing Sheets

(56) References Cited

OTHER PUBLICATIONS

Ben Kehoe et al "Cloud-Based Robot Grasping with the Google Object Recognition Engine" IEEE 2013 [Online] Downloaded Feb. 14, 2019.*
Finn, Chelsea, Ian Goodfellow, and Sergey Levine. "Unsupervised LEarning for Physical Interaction through Video Prediction" 2016 [Online] Downloaded Aug. 7, 2019 http://papers.nips.cc/paper/6161-unsupervised-learning-for-physical-interaction-through-video-prediction.pdf (Year: 2016).*
Althoefer et al., "Reinforcement Learning in a Rule-Based Navigator for Robotics Manipulators", Neurocomputing, 2001, vol. 37, pp. 51-70.
Baird III, Leemon C., "Reinforcement Learning Though Gradient Descent", Thesis, School of Computer Science, Carnegie Mellon University, May 14, 1999, pp. 78.
Botterill et al., "Speeded-Up Bag-of-Words Algorithm for Robot Localisation through Scene Recognition", In Proceedings of Image and Vision Computing New Zealand, IEEE 2008, pp. 6.
Hager et al., "Robot Feedback Control Based on Stereo Vision: Towards Calibration-Free Hand-Eye Coordination", IEEE, 1994, pp. 2850-2856.
Kehoe et al., "Cloud-Based Robot Grasping with the Google Object Recognition Engine", 2013 IEEE International Conference on Robotics and Automation (ICRA), Karlsruhe, Germany, May 6-10, 2013, pp. 4263-4270.
LeCun et al., "Convolutional Networks and Applications in Vision", IEEE 2010, pp. 253-256.
Salimans et al., "Evolution Strategies as a Scalable Alternative to Reinforcement Learning", Sep. 7, 2017, version 2, pp. 13.
Abbeell, Pieter, Apprenticeship Learning via Inverse Reinforcement Learning, Appearing in Proceedings of the 21st International Conference on Machine Learning, Banff, Canada, 2004, available at http://www.cs.stanford.edu/~pabbeel/irl/.
Abbeell, Pieter, Apprenticeship Learning and Reinforcement Learning with Application to Robotic Control, Ph.D. Dissertation, Stanford University, Computer Science, Aug. 2008, available at http://ai.stanford.edu/~pabbeel/thesis/thesis.pdf.
Christiano, et al., Deep Reinforcement Learning from Human Preferences, arXiv:1706.03741 [stat.ML], Jul. 13, 2017, available at https://arxiv.org/abs/1706.03741.
Krizhevsky, et al., ImageNet Classification with Deep Convolutional Neural Networks, Part of: Advances in Neural Information Processing Systems 25 (NIPS 2012), available at https://papers.nips.cc/paper/4824-imagenet-classification-with-deep-convolutional-neural-networks.pdf.
OpenAI, Learning from Human Preferences, Jun. 13, 2017 available at https://blog.openai.com/deep-reinforcement-learning-from-human-preferences/.
OpenAI, Gathering Human Feedback, Aug. 3, 2017, available at https://blog.openai.com/gathering_human_feedback/.
KUKA Robot Group, "KUKA Robot Bottle Flip Challenge—Machine Learning in Practice", as published Apr. 19, 2017, https://web.archive.org/web/20170419163622/www.youtube.com/watch?v=HkCTRcN8TB0, 1 page.

* cited by examiner

ARTIFICIAL INTELLIGENCE SYSTEM FOR MODELING AND EVALUATING ROBOTIC SUCCESS AT TASK PERFORMANCE

BACKGROUND

Artificial intelligence describes computerized systems that can perform tasks typically considered to require human intelligence. The capability to learn is an important aspect of intelligence, as a system without this capability generally cannot become more intelligent from experience. Machine learning is a field of computer science that gives computers the ability to learn without being explicitly programmed, for example enabling artificial intelligence systems to learn complex tasks or adapt to changing environments.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1A:
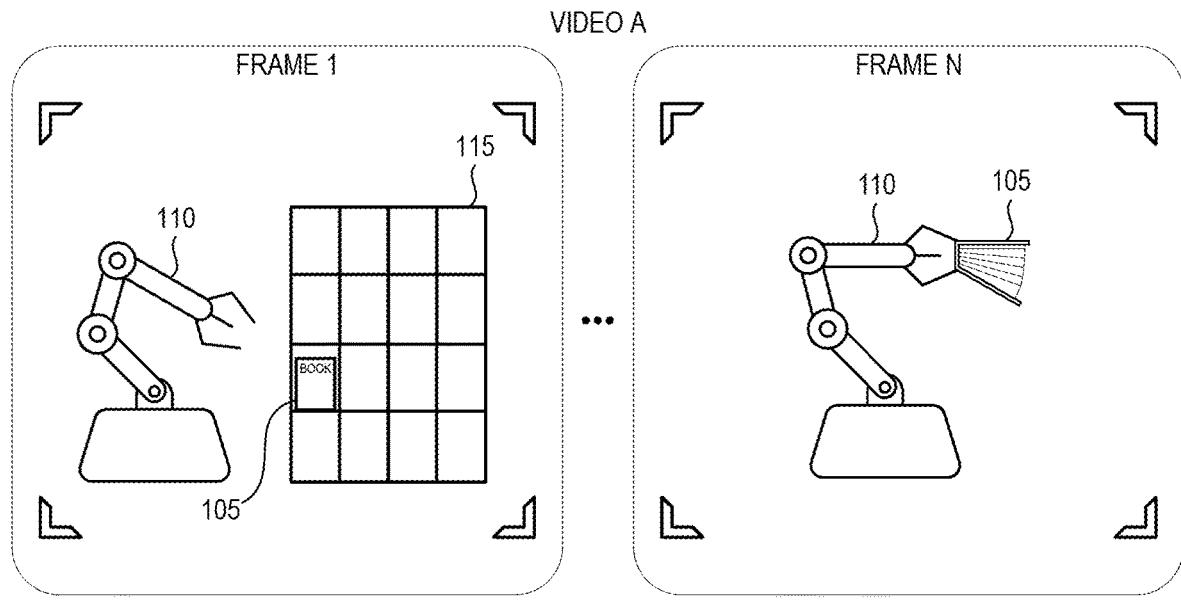
FIGS. 1A and 1B depict examples of recorded observations of robotic task performance.

The present disclosure is generally directed to using artificial intelligence or machine learning systems to build and use computer models for evaluating the success of a robotic system in performing a given task. For example, a training system can capture videos of a robot performing a task and provide these videos to the computer model for automated evaluation. The result of this evaluation by the computer model can be used to generate and/or recalibrate the control policy that dictates what sequence of actions the robot will take to perform the task. By using machine-learned computer models to evaluate task performance, the present technology is able to identify the factors that lead to success at a task and then leverage knowledge of those factors to develop robotic control policies without requiring significant human oversight throughout the process.

Reinforcement learning is an area of machine learning that seeks to learn how to make decisions in order to maximize rewards or minimize costs over a period of time. A reinforcement learning system can be used to generate a control policy, for example a policy for controlling a robotic system or computer-simulated agent, that in turn dictates the actions taken within the environment that will maximize the reward. To generate this policy, the robotic system takes actions to attempt to perform the task, and then a value called a "reward" is provided to the reinforcement learning system. This reward indicates the quality of task performance but does not tell the reinforcement learning system what the correct decisions or actions would have been. Through exploration (e.g., searching for new options) and exploitation (e.g., refining existing options that have resulted in desired rewards), the reinforcement learning system can learn the control policy that maximizes the accumulated sum of rewards over time.

The reward is typically determined by a reward function. The reward function can be considered as a model of the goal of the tasks and may be expressed as weighted factors that influence success at task performance. In many reinforcement learning systems, the reward function is written by a human who has familiarity with the task and has analyzed the task to determine what factors contribute to success at performance of the task. However, for complex tasks (e.g., autonomous driving or flying) and even some non-complex tasks, it may not be clear to the human programmer how to construct a suitable reward function, which will need to be a function of the robot's sensors. The difficulty of manually specifying a reward function represents a barrier to applying reinforcement learning to such tasks.

In some scenarios, inverse reinforcement learning can be used to extract a reward function from a corpus of demonstrations of the desired task. This approach is not directly applicable to tasks that are difficult or impossible for humans to demonstrate, such as robotic tasks that require structures and movements dissimilar to those of the human body. Some other approaches have sought to solve the complex reward function problem by (1) obtaining human input evaluating the success of a given instance of robotic task performance, (2) learning a reward function from the human feedback, and (3) optimizing a policy from this reward function. However, due to the volume of data required to train a policy, with these approaches human feedback is typically obtained on less than 1% of agent interactions with the environment (see Christiano, (2017), Deep Reinforcement Learning from Human Preferences). Further, the resulting reward function may not represent the true model of task success due to human error in labeling task success, inconsistencies between different humans labeling the same performance, or the human having a poor grasp of the task.

Further, an open challenge in reinforcement learning is how to structure gradient rewards for activities where a robot either succeeds or fails. For instance, the game of flipping a water bottle and landing it has an obvious binary result—the bottle will either land upright or fall over. For reinforcement learning, rather than a binary success/fail reward, it can be desirable to provide a reward that is a gradient—that is, a value that expresses how close a particular performance came to succeeding.

The disclosed systems solve at least some of the aforementioned problems, among others, by training a machine learning classifier to evaluate task performance and then implementing this trained classifier to generate a reward representing task success. For example, a convolutional neural network can be trained to identify successful task performance in videos or other recorded observations of the task. Recorded observations of a particular robotic system performing the task can be provided to the trained classifier, which can then provide an automated evaluation of the robot's performance. The feedback from the classifier can be used to build the reward function and control policy that will dictate future actions taken by the robot when performing the task. This reward function can be used to provide a gradient reward to the reinforcement learning system. Beneficially, the disclosed techniques can also be leveraged to recalibrate robotic systems by using a trained machine learning classifier to detect when robot task performance becomes less successful, and by using the output of the classifier to recalibrate the reward function and policy of the robotic system.

To illustrate, consider the example presented by FIGS. 1A-1D. FIG. 1A depicts a first example of a recorded observation of a robot 110 performing an example task of picking up a book 105 from a storage structure 115. Such an arrangement may, for example, exist in an order fulfillment center in which a robotic system picks up ordered items from storage structures and transfers them for example to bins or boxes for shipment to customers. Thus, picking up the book 105 represents one task of many potential tasks that the robot 110 may be programmed and configured to perform within such an order fulfillment center. In this example, the recorded observation is video A having a number of image frames (frame 1 through frame N) each having an array of pixels depicting the robot 110, the book 105, and/or the environment. Other examples may focus the video on the target object (here, the book 105) without necessarily capturing the entire robot 110 in the frame, as the movements of the robot 110 during task performance may be ascertained from robotic position data of the robotic controller. As illustrated, video A shows the robot 110 approaching the storage structure 115 and then picking up the book 105 by its spine. As such, in the frame N the covers of the book have opened. This way of grasping the book may result in damage to the pages or spine, the hanging cover of the book colliding with other objects in the environment, or the book slipping from the robot's grasp. However, absent any feedback the robot 110 would not be able to determine that this is sub-optimal task performance.

Figure 1B:
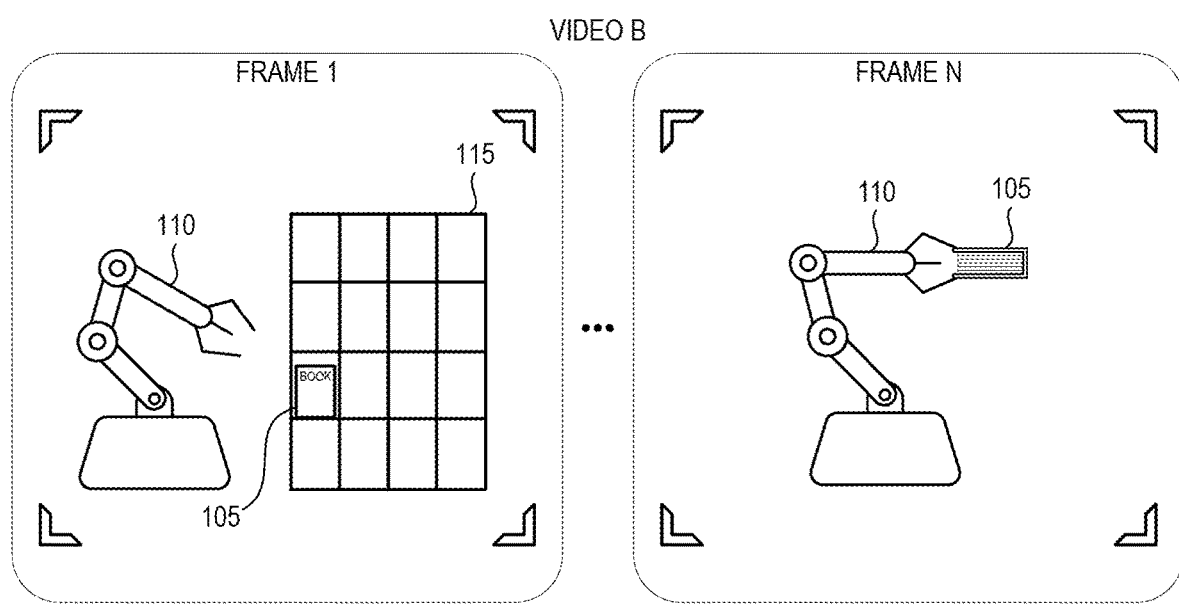

FIG. 1B depicts a second example of the robot 110 performing the task, as recorded in video B. As illustrated, video B shows the robot 110 approaching the storage structure 115 and then picking up the book 105 on the edge opposing its spine. As such, in the frame N the covers of the book are closed. This way of grasping the book is more likely to result in the book reaching its target destination without damage, and thus can be considered as an example of success at performance of the task. Again, absent any feedback the robot 110 would not have any knowledge that its performance during video B was more optimal task performance than its performance in video A.

Figure 1C:
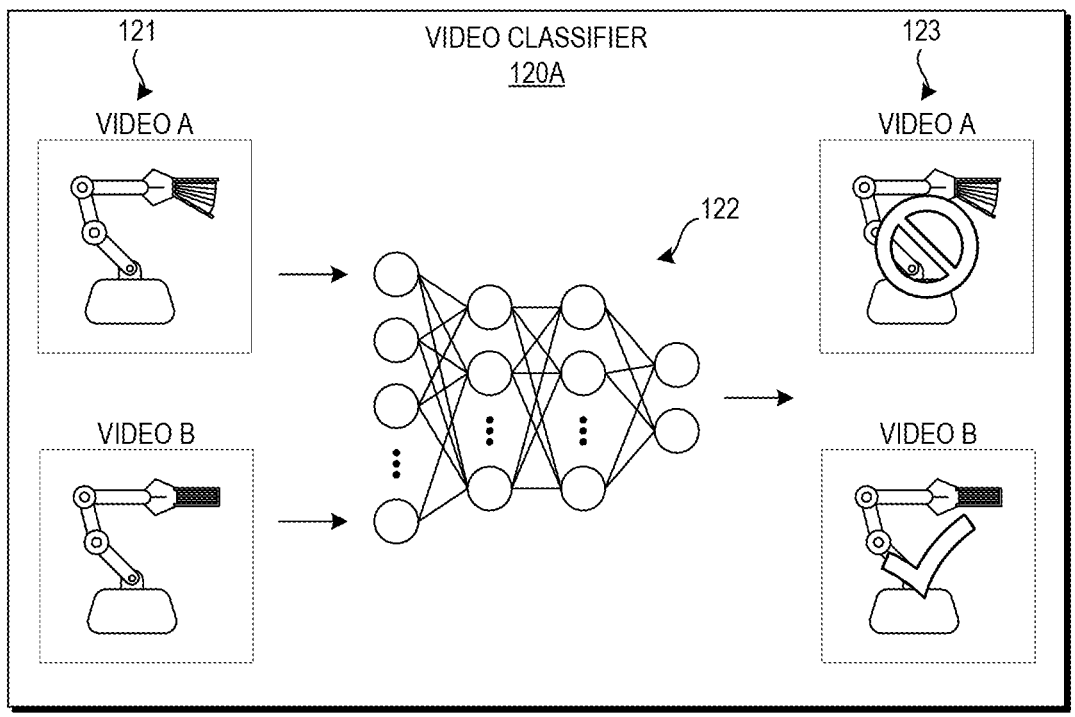
FIGS. 1C and 1D depict graphical representations of example machine learning evaluation of the performance quality of the example recorded observations of FIGS. 1A and 1B.
Figure 1D:
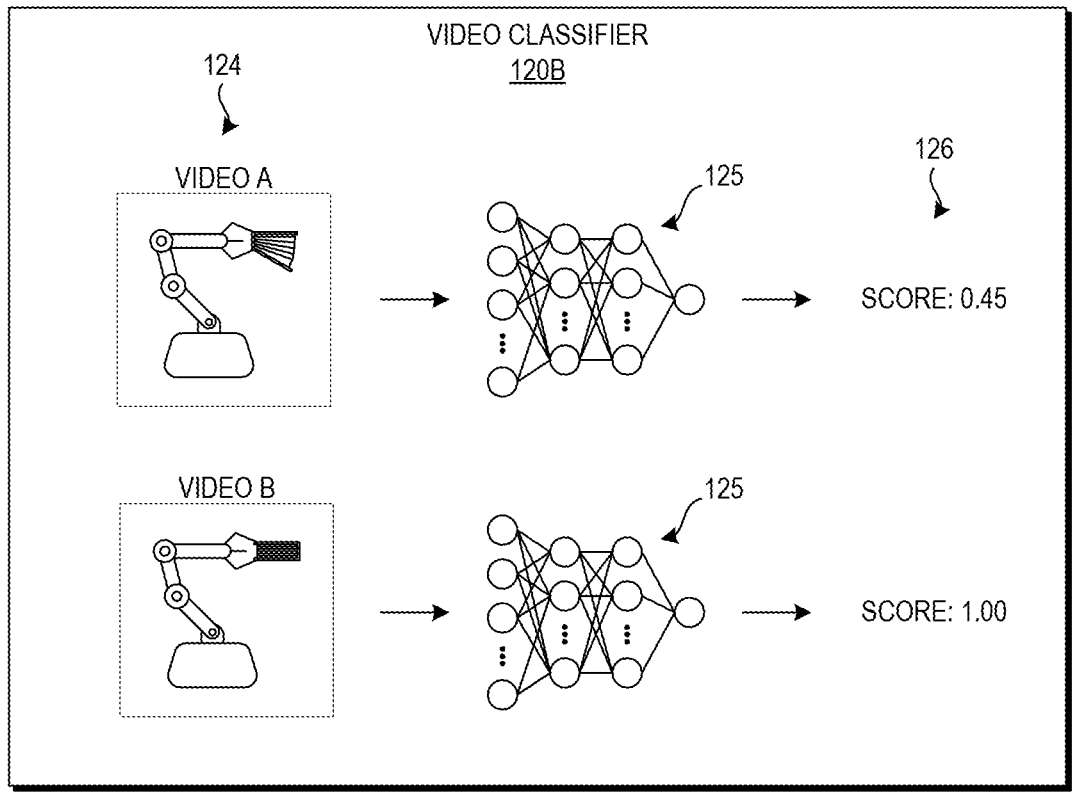

FIGS. 1C and 1D depict graphical representations of example machine learning evaluation of the task performance represented by FIGS. 1A and 1B. FIG. 1C depicts a first embodiment of a video classifier 120A that takes video A and video B as inputs 121, passes a representation of these videos through artificial neural network 122, and outputs a comparison preference 123. Artificial neural networks are artificial in the sense that they are computational entities, inspired by biological neural networks but modified for implementation by computing devices. Artificial neural networks are used to model complex relationships between inputs and outputs or to find patterns in data, where the dependency between the inputs and the outputs cannot be easily ascertained. A neural network typically includes an input layer, one or more intermediate ("hidden") layers, and an output layer, with each layer including a number of nodes. A neural network is considered "deep" when it includes two or more hidden layers. The nodes in each layer connect to some or all nodes in the subsequent layer and the weights of these connections are typically learnt from data during the training process, for example through backpropagation in which the network parameters are tuned to produce expected outputs given corresponding inputs in labeled training data. Thus, an artificial neural network is an adaptive system that is configured to change its structure (e.g., the connection configuration and/or weights) based on information that flows through the network during training, and the weights of the hidden layers can be considered as an encoding of meaningful patterns in the data.

During training, the artificial neural network 122 learns for example what pixel values or sequences of pixel values in the input video data correspond to success at performance of the task, or what vector values in vector representations of the videos correspond to success at performance of the task. The artificial neural network 122 encodes this learned information in the parameters of its hidden layers (e.g., its weights) such that it can provide an automated comparison between two new input videos. The illustrated artificial neural network 122 has two output nodes, one for each of video A and video B, and the values of these output nodes are used to provide the comparison preference 123. The artificial neural network 122 can take image pixel values (e.g., for some or all of frames 1-N of videos A and B) or a vector representation of each video as inputs 121, process these values using the parameters of the hidden layers, and generate (at the output nodes) either a numeric score for each video or output a "1" for the preferred video an a "0 for the un-preferred video. For example, the neural network 122 can include two pipelines (e.g., two networks having the same structure and hidden layer parameters as one another) that each transform the input data of one of the input videos into an output score, and can also include an additional comparison layer or module that identifies which video generated a higher score and selects this video as the preferred video. Other suitable models for generating comparison preferences can be used in other embodiments.

As illustrated in FIG. 1C, comparison preference 123 indicates that video B is preferred over video A. This preference, computed by the artificial neural network 122, indicates that video B represents a higher degree of success than video A, and may or may not indicate that video B represents an ideal of success. For example, during training human preferences can be used to set these output scores or binary preferred/not preferred outputs, and the artificial neural network 122 can learn the features of input pixel values or vector representations of the videos that lead to the provided preference labels. The parameters of the artificial neural network 122 can be set to produce the expected outputs, and thus may be considered as an encoding of patterns in the input data that produce certain scores or preferences. As explained in more detail below, the parameters of a reward function representing what it means to succeed at picking up a book (or another task) can be optimized to fit a number of comparisons provided by such an artificial neural network 122.

FIG. 1D depicts another embodiment of a video classifier 120B that takes video A and video B as inputs 124, passes a representation of each video through a convolutional neural network (CNN) 125, and outputs a reward score 126 for each video. The CNN 125 may be AlexNet or other suitable CNN models. In this embodiment, the video classifier 120B analyzes a single video at a time, however scores 126 for both video A and video B are shown to illustrate an example result of the automated evaluation.

A CNN 125 is a type of artificial neural network, and like the artificial neural network described above, a CNN is made up of nodes and has learnable weights. However, the layers of a CNN can have nodes arranged in three dimensions: width, height, and depth, corresponding to the 2×2 array of pixel values in each video frame (e.g., the width and height) and to the number of video frames in the sequence (e.g., the depth). The nodes of a layer may only be locally connected to a small region of the width and height layer before it, called a receptive field. The hidden layer weights can take the form of a convolutional filter applied to the receptive field. In some embodiments, the convolutional filters can be two-dimensional and thus convolutions with the same filter can be repeated for each frame (or convolved transformation of an image) in the input volume or for designated subset of the frames. In other embodiments, the convolutional filters can be three-dimensional and thus extend through the full depth of nodes of the input volume. The nodes in each convolutional layer of a CNN can share weights such that the convolutional filter of a given layer is replicated across the entire width and height of the input volume (e.g., across an entire frame), reducing the overall number of trainable weights and increasing applicability of the CNN to data sets outside of the training data. Values of a layer may be pooled to reduce the number of computations in a subsequent layer (e.g., values representing certain pixels may be passed forward while others are discarded), and further along the depth of the CNN pool masks may reintroduce any discarded values to return the number of data points to the previous size. A number of layers, optionally with some being fully connected, can be stacked to form the CNN architecture.

During training, the CNN 125 learns for example what pixel values or sequences of pixel values in the input video data correspond to success at performance of the task and encodes this information in the values of its convolutional filters such that it can provide an automated evaluation of task performance shown in new input videos. The illustrated CNN 125 has a single output node, and the value generated at this output node is the reward score 126. The CNN 125 can take image pixel values (e.g., for some or all of frames 1-N of video A) of the video as input 121, process these values using the convolutional filters of the hidden layers, and generate (at the output nodes) either a score for each video. Other suitable models for generating reward scores 126 can be used in other embodiments, and may operate on other information representing the video (e.g., a vector representation) instead of or in addition to the pixel values of the video frames.

As illustrated in FIG. 1D, the reward score 126 for video A is 0.45 while the reward score for video B is 1.00. These scores, computed by the CNN 125, indicate that video B represents a higher degree of success than video A. As explained in more detail below, the parameters of a reward function representing what it means to succeed at picking up a book (or another task) can be optimized to fit a number of reward scores provided by such a CNN 125. In some embodiments, the reward scores 126 output from the video classifier 120A can be used directly as a reward function rather than used to model a separate reward function.

FIGS. 1A-1D represent picking up a book as one example of a robotically-performed task that can be evaluated using a machine learning classifier as described herein, provided to illustrate the disclosed machine learning techniques. Other example real-world tasks include transferring other objects to and from storage structures, moving objects onto conveyor belts, item manipulation, autonomous movement through static or dynamic environments such as warehouses, autonomous flying, lifting objects, and flipping a bottle. As another example, the disclosed techniques can be used to learn reward functions and train control policies for robots that perform, or assist in the performance of, surgical procedures. In some implementations, the disclosed techniques may be particularly useful for generating reward functions and control policies for tasks that humans find difficult, as the reward functions and control policies for such tasks may be particularly challenging to write by hand. Example virtual world tasks include navigating a virtual environment, playing a game, and interacting with humans from the virtual environment.

FIGS. 1A-1D also represent two examples of machine learning classifiers that can be used to automate the writing of control functions based on analysis of recorded video observations. In other examples, different types of machine learning classifiers can be used to provide feedback on any of a variety of recorded observations of task performance. Suitable machine learning classifiers can include artificial neural networks (including deep neural networks, convolutional neural networks, and recurrent neural networks), capsule networks, Generative Adversarial Networks (GANs), decision trees, random forests, support vector machines, and logistic regression, depending upon the nature of the particular task. In some embodiments, capsule networks may be particularly well suited to image analysis due to the flexibility of these networks in recognizing objects from different view perspectives. The machine learning classifiers can be trained using supervised training (e.g., provided with labeled data of task performance examples that are successful, not successful, or on a spectrum between successful and not successful) or unsupervised training (e.g., clustering based methods for identifying, from a corpus of recorded observations, task performance examples that are successful, not successful, or on a spectrum between successful and not successful). The disclosed machine learning classifiers may utilize vector representations of the recorded observation data to calculate comparison preferences or performance scores. Recorded observations can include audio signals, still images, video images sequences, electromagnetic tracking data, and textual information, depending upon the nature of a particular task. Recorded observations can additionally or alternatively include data from sensors on the robot or the target object of the task, for example data from strain gauges, torque sensors (e.g., back EMF sensors), inertial sensors (e.g., gyroscopes, accelerometers), optical sensors, radio frequency sensors, magnetic wave detectors, haptic sensors, air pressure sensors, and piezoelectric sensors.

Such machine learning classifiers can be trained prior to reward function and policy generation, for example using training data of humans performing the task, training data of other robotic systems or computer simulations performing the task, or a combination of these types of training data. The trained models can then be used to learn the reward function and/or policy of a particular robotic system performing the task. In other embodiments, a classifier can be trained in parallel with reward function and policy generation, for example based on labels applied to recorded observations of the particular robotic system performing the task during exploration and exploitation. Beneficially, in some embodiments a trained classifier, a robotic system having a robot controlled via a previously-optimized policy, an observation system, and a reinforcement learning system can cooperate together in a closed loop for automated monitoring of the robot's performance and recalibration of the reward function and/or policy.

Although aspects of some embodiments described in the disclosure will focus, for the purpose of illustration, on particular examples of training data, tasks, and robotic systems, the examples are illustrative only and are not intended to be limiting. In some embodiments, the techniques described herein may be applied to additional or alternative training data, agents, and tasks. For example, though described primarily with reference to generation of reward functions and control policies that control the behavior of a robotic system, the disclosed techniques can be applied to simulated (e.g., virtual) artificial intelligence in other embodiments. The disclosed techniques can be used to train an artificial intelligence agent that operates in a virtual reality environment or that interacts from a digital environment with humans through a user interface. As such, the use of the word "agent" herein can refer to either a physical robotic system or a simulated or virtual agent. Various aspects of the disclosure will now be described with regard to certain examples and embodiments, which are intended to illustrate but not limit the disclosure.

Overview of Example Machine Learning System

FIG. 2 is a block diagram of an illustrative interactive computing system 200 configured to implement a machine learning robotic controller generator as described above. As illustrated, the interactive computing system 200 includes a robotic system 210, an observation system 215, and a robotic control system 220 configured to communicate data with one another via network 260.

The robotic system 210 can be a robot having a number of linkages coupled by a number of joints (motorized or passive) and one or more end effectors configured to interact with the robot's environment. Another example of a robot can include mechanisms for moving the robot about its environment, for example wheels or legs driven by computer-controlled motors, pneumatic systems, or jet propulsion systems (e.g., for aerial robots). The robotic system 210 can also include one or more sensors configured to perceive its environment, for example sensors suitable for perceiving visual, audible, or other sensory parameters of the environment, or for example sensors suitable for perceiving electromagnetic signals emitted from objects within the environment. The structure and sensors of the robotic system 210 can be selected or designed for performance of a particular task or set of tasks, for example warehouse inventory management, aerial package delivery, or surgical procedures, to name a few examples. Alternative examples of the disclosed techniques can instead relate to a virtual reality agent configured to interact with a virtual environment and/or with humans through a user interface from within a digital environment.

The observation system 215 includes one or more sensors positioned and configured to observe the robotic system 210 as it performs its tasks. Suitable sensors include image sensors (e.g., cameras), microphones, and electromagnetic position sensors, to name a few examples. The observation system 215 can generate still images, videos, audio recordings, and/or positional tracking data representing the robotic system 210 performing a task (or representing the target objects of the task). The observation system 215 may be integrated into the robotic system 210, may be a separate structure that is mobile and configured follow the robotic system 210 as it moves about its environment, and/or may include one or more stationary sensors. In embodiments implementing a virtual agent as the robotic system 210, the observation system 215 can be a computing system configured to record events occurring within the virtual environment. The observation system 215 can send its recorded observation data to the robotic control system 220.

The robotic control system 220 can provide programmatic control of the robotic system 210, for example by maintaining robotic position data, determining a sequence of actions needed to perform tasks, and causing actuation of the various components of the robotic system 210. The robotic control system 220 is illustrated graphically as a server system, and the server system can be configured to control (via network 260) a number of remote robotic systems that are the same or different from one another that are performing the same task or different tasks. In other embodiments, the robotic control system 220 can instead be integrated into the robotic system 210. As such, the robotic control system 220 may include one or more computers, perhaps arranged in a cluster of servers or as a server farm. The memory and processors that make up these computers may be located within one computer or distributed throughout many computers (including computers that are remote from one another) as detailed herein. These servers may be configured to generate and implement robotic control policies.

Other devices may access the network 260 to interact with one or more of robotic system 210, observation system 215, a robotic control system 220, for example user computing devices of users providing input into the machine learning classifier training process.

The robotic control system 220 may include at least one memory 206 and one or more processing units (or processor(s)) 208. The memory 206 may include more than one memory and may be distributed throughout the robotic control system 220. The memory 206 may store program instructions that are loadable and executable on the processor(s) 208 as well as data generated during the execution of these programs. Depending on the configuration and type of memory, the memory 206 may be volatile (such as random access memory (RAM)) and/or non-volatile (such as read-only memory (ROM), flash memory, or other memory). In some examples, the memory 206 may include multiple different types of memory, such as static random access memory (SRAM), dynamic random access memory (DRAM), or ROM.

Figure 2A:
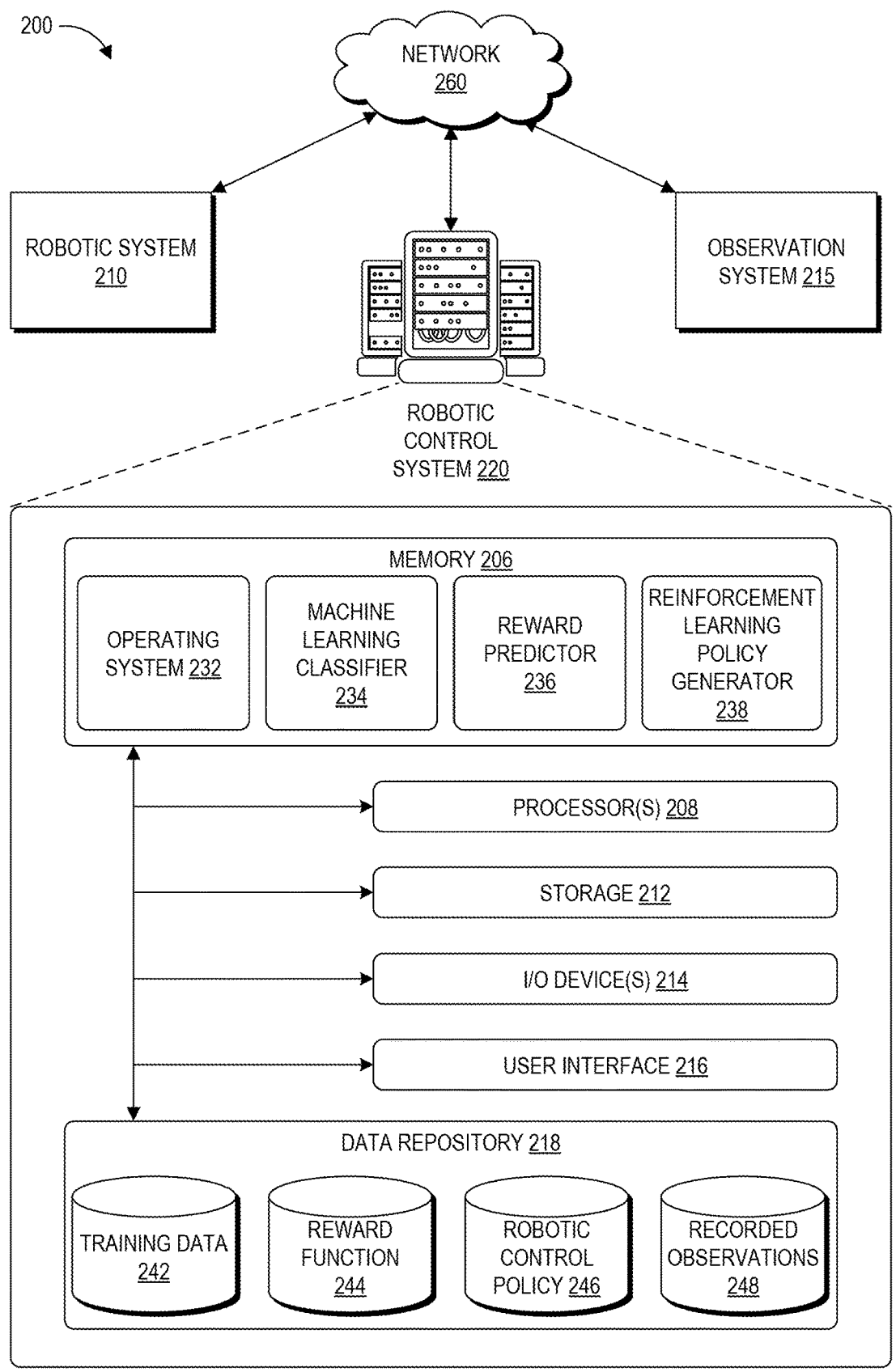
FIG. 2A is a block diagram of an illustrative computing system configured to implement a machine learning system for robotic control.
Figure 2B:
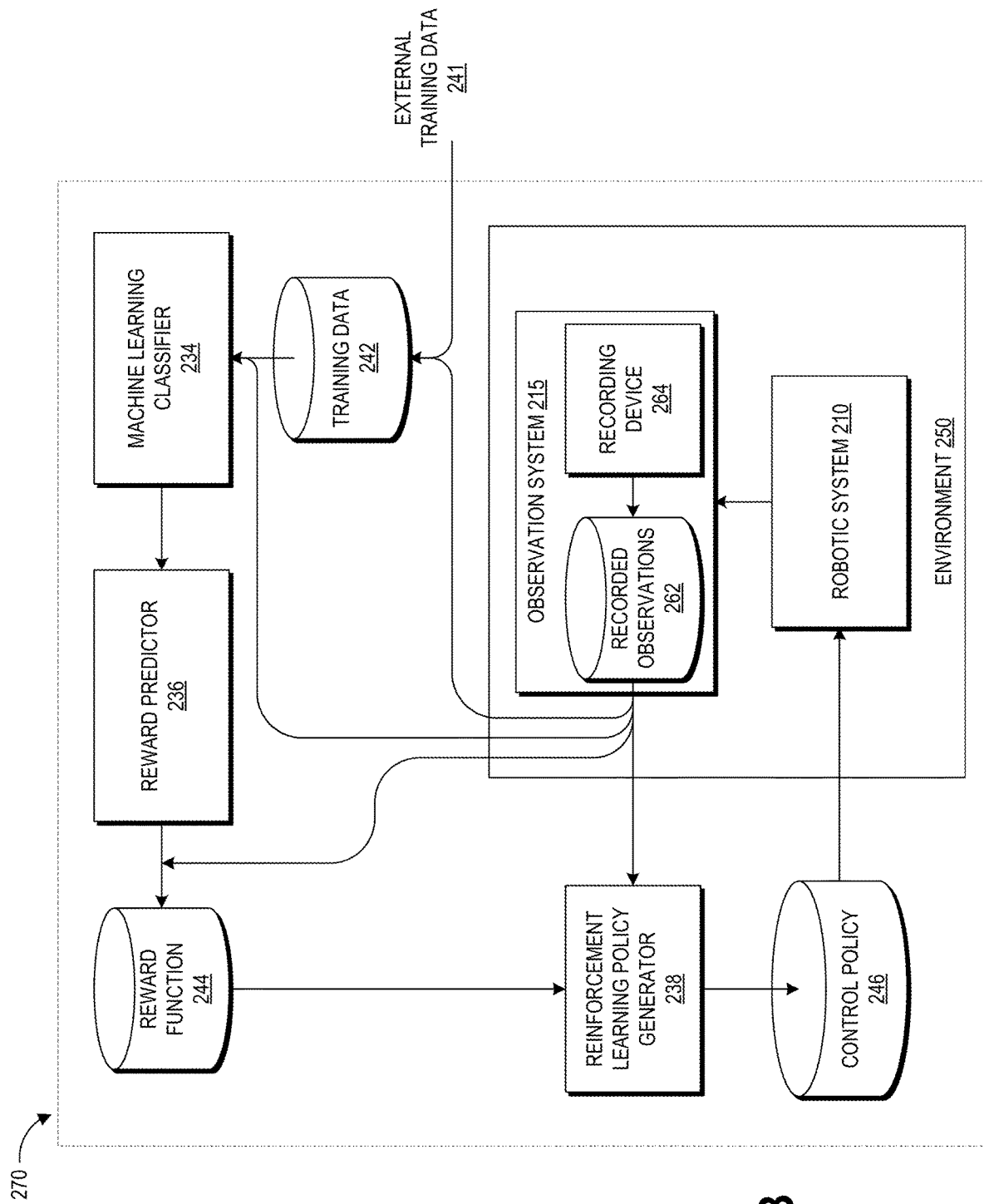
FIG. 2B is a schematic diagram of illustrative components and data flow within the machine learning system of FIG. 2A, according to some embodiments.

The memory can store the program instructions as a number of modules that configure processor(s) 208 to perform the various functions described herein, for example operating system 232 for interacting with the interactive computing system 200, as well as some or all of machine learning classifier 234, reward predictor 236, and reinforcement learning policy generator 238, the configurations of which are described in more detail with respect to FIG. 2B. The machine learning classifier 234, reward predictor 236, and reinforcement learning policy generator 238 can be in direct communication with one another or distributed among computing devices within a networked computing system and in communication with each other. Components used for the architecture may depend at least in part upon the type of network and/or environment selected.

The processor 208 may include one or more general purpose computers, dedicated microprocessors, graphics processors, or other processing devices capable of communicating electronic information. Examples of the processor 208 include one or more application-specific integrated circuits (ASICs), graphical processing units (GPUs), field programmable gate arrays (FPGAs), digital signal processors (DSPs) and any other suitable specific or general purpose processors. The processor 208 may be implemented as appropriate in hardware, firmware, or combinations thereof with computer-executable instructions and/or software. Computer-executable instructions and software may include computer-executable or machine-executable instructions written in any suitable programming language to perform the various functions described.

In some examples, the robotic control system 220 may also include additional storage 212, which may include removable storage and/or non-removable storage. The additional storage 212 may include, but is not limited to, magnetic storage, optical disks, and/or solid-state storage. The disk drives and their associated computer-readable media may provide non-volatile storage of computer-readable instructions, data structures, program modules, and other data for the computing devices. The memory 206 and the additional storage 212, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, and components, may refer to programming modules executed by computing systems (e.g., processors) that are part of the architecture.

The robotic control system 220 may also include input/output (I/O) device(s) and/or ports 214, such as for enabling connection with a keyboard, a mouse, a pen, a voice input device, a touch input device, a display, speakers, a printer, or other I/O device. The robotic control system 220 may also include a user interface 216. The user interface 216 may be utilized by a user to access portions of the interactive computing system 200. In some examples, the user interface 216 may include a graphical user interface, web-based applications, programmatic interfaces such as application programming interfaces (APIs), or other user interface configurations. The user interface 216 can include displays of the recommendations described herein. In some embodiments, the I/O device(s) and/or ports 214 and user interface 216 can be part of a user computing device accessing robotic control system 220 via network 260.

The robotic control system 220 also includes a data store 218. In some examples, the data store 218 may include one or more data stores, databases, data structures, or the like for storing and/or retaining information associated with the interactive computing system 200. Thus, the data store 218 may include data structures, such as training data repository 242, reward function data repository 244, robotic control policy data repository 246, and recorded observations data repository 248. The nature and structure of the data stored in these repositories is described in more detail with respect to FIG. 2B below.

The robotic control system 220 can communicate over network 260 with robotic system 210, observation system 215, and any user devices involved in the machine learning processes described herein. The network 260 can include any appropriate network, including an intranet, the Internet, a cellular network, a local area network or any other such network or combination thereof. For example, network 260 may be a publicly accessible network of linked networks, possibly operated by various distinct parties, such as the Internet. In other embodiments, the network 260 may include a private network, personal area network, local area network, wide area network, cable network, satellite network, cellular telephone network, etc. or a combination thereof, some or all of which may or may not have access to and/or from the Internet.

With reference to an illustrative embodiment, FIG. 2B shows a schematic diagram of illustrative data flow 270 between the components of the interactive computing system 200 that can provide automated evaluation of robotic task performance and generation and/or refining of rewards and control policies.

The machine learning classifier 234 is a module configured to learn the parameters that enable it to evaluate the level of success at a particular task that is represented by input data. The training data repository 242 stores training data that can be used to learn these parameters, and as illustrated can include one or both of external training data 241 and data received from observation system 215. External training data 241 can include examples of task performance by a human, computer simulation, or a different robotic system, and preferably is in the same format as the data that is received from the observation system 215. Data received from the observation system 215 may depict one or more robotic systems 210 performing the task. In some embodiments, the external training data 241 can include human-provided labels (e.g., A or B preferences, success level scores, or binary success/failure indications) on data received from the observation system 215.

The machine learning classifier 234 can be trained using supervised training using labeled training data in some examples, where the parameters of the classifier 234 are adjusted through backpropagation or other techniques to produce an expected output when provided with a corresponding input. For example, the parameters of the classifier can be adjusted to produce a human-labeled success score when provided with the task performance video viewed by the human labeler. This can be repeated for a number of examples, for example hundreds or thousands of examples, to produce a set of parameters that generalizes to make accurate evaluations of new data.

In other examples the classifier 234 can be trained using unsupervised training. For example, when provided with a large corpus of training examples of successful (or unsuccessful) task performance, the classifier 234 can use clustering and/or correlation analysis to identify features common to a significant subset of the training examples. The parameters of the classifier 234 can be set to identify such features in new input data to determine whether the new input data matches the paradigm of success (or failure) represented by the training examples.

In some embodiments the classifier 234 can be trained prior to policy generation, while in other embodiments the classifier 234 can be trained in parallel (e.g., in a training loop) with the reward function 244 and/or policy 246.

The classifier 234 can be a neural network or other machine learning model as described above. In some embodiments, multiple forms of recorded observation data can be provided to the machine learning classifier 234, for example video frames and audio signals, or audio signals and vector representations of images of task performance. In such embodiments, the classifier 234 can include multiple network architectures (e.g., a CNN and a fully connected neural network) each configured to evaluate a different type of the recorded observation data. The outputs of these networks may be used together to determine the final evaluation of task performance. Two examples of suitable machine learning classifiers 234 are described above with respect to FIGS. 1C and 1D.

The output of the classifier 234 can be provided to the reward predictor 236. The reward predictor 236 is a machine learning module configured to shape the reward function 244. As described herein, the reward function 244 represents a model of what it means to succeed at the task. The reward function data repository 244 stores the reward function output from the reward predictor 236, both during learning iterations and in its finalized form.

In some embodiments, a control engineer may input features that influence the success of the task performance, and the reward predictor 236 may learn the weights of these features that fit the output of the classifier 234. In other embodiments, the reward predictor 236 may receive no input data and can build a model of a feature set and associated weights that fit the output of the classifier 234. The reward predictor 236 can be a machine learning model, for example a Bayesian model that fits the reward function 244 to the feedback from the classifier 234 using Bayesian inference. Another example of a suitable machine learning architecture for the reward predictor 236 is a deep artificial neural network. In some examples, the reward predictor 236 may be an ensemble of predictors, each trained on a different subset of training data. In use, the reward function 244 can receive recorded task observation data and generate a reward value representing the level of success of the recorded observation. The reward value output from the reward function 244 can be provided to the reinforcement learning policy generator 238.

For example, first and second recorded observations ($O_1$ and $O_2$) can represent a transition from a first state $s_0$ to a second state $s_n$, either sequentially or with one or more intervening states. A preference between these two elicited from the classifier 234 can be stored as a tuple $\{O_1, O_2, \mu\}$ with $\mu$ representing a distribution indicating which observation is preferred. This value can be weighted entirely toward one observation or the other if the classifier clearly expresses a preference, uniform if the observations are equally preferable, or weighted partially toward one observation. The system 220 may generate a number of such tuples based, for example, on a number of recorded observations and/or on comparisons between different portions of the observations. Given a number of such tuples, the reward function 244 can be determined as a latent factor explaining the classifier's preferences using the assumption that the classifier's probability of preferring a particular observation depends exponentially on the value of the latent reward summed over the length of the observation. For example, the reward function 244 can be chosen to minimize cross-entropy loss with the classifier's labels.

In other embodiments, the output from the machine learning classifier 234 may represent the reward value and the reward predictor 236 and reward function 244 can be omitted, with the classifier output provided directly to the policy generator 238 as the reward value. For example, a recorded observation can represent a transition from a first state $s_0$ to a second state $s_n$, either sequentially or with one or more intervening states. The score r output from the classifier 234 can represent a reward for the state $s_0$ to state $s_n$ transition, and state to state transition probabilities in the policy can be generate based on these rewards. For example, the robotic control system 220 can store a number of tuples $\{s_0, s_n, r\}$ representing the rewards for transitioning from state $s_0$ to state $s_n$ across a number of state pairs, and can fit the state to state transition probabilities in the policy to fit these tuples. The classifier 234 can be used to evaluate different segments of a recorded observation to provide rewards for various state to state transitions.

The policy generator 238 is a reinforcement learning module configured to optimize the policy for a particular task based on reward values output from the reward function 244. The policy can be framed as a sequential decision making problem posed in a Markov decision process (MDP) setting. MDPs model state-transition probabilities; for example a MDP=(S, A, P, R) represents a set of states S, a set of actions A, the expected immediate rewards R received at the transition from state to state by executing an action from the set of actions A, and transition probabilities P. The probability that in a first state a particular action takes the robotic system 210 to a second state can be learned by the policy generator 238 based on received rewards. The policy $\pi: S \rightarrow A$ is a mapping from the set of states to the set of actions. Other example MDP and policy formats may be used by the policy generator 238. The goal of the policy generator 238 can be to maximize the accumulated reward over time (e.g., over the course of a performance of the task) based on learning the state transition probabilities that produce the optimal policy. Though described primarily in the context of reinforcement learning, other types of machine learning including evolution strategies may be suitable in other examples for learning policies. The control policy data repository 246 stores the policy output from the policy generator 238, both during learning iterations and in its finalized form.

Complex or multi-task control applications, for example autonomous robot navigation and robotic object manipulation, may require simultaneous implementation of a broad range of learning tasks including recognition and navigation of the surrounding environment, motion control, object recognition, object manipulation, and other tasks. In order to handle these tasks simultaneously, individual tasks can be implemented using separate policies or a generalized probabilistic control model configured to simultaneously handle various learning tasks. The policy generator 238 can be configured to generate such separate task-specific policies or a generalized probabilistic model, depending upon the desired control system.

The policy 246 is provided to robotic system 210 operating within environment 250 to perform the designated task. Observation system 215 is also positioned in the environment 250. As described above, the observation system 215 includes one or more sensors (e.g., recording device(s) 264) positioned and configured to observe the robotic system 210 as it performs its tasks. This data can be locally stored in recorded observations data repository 262 in some embodiments and/or may be provided to a centralized recorded observations data repository 248 of a server-based robotic control system 220. In some examples, the recorded observations data repository 262 can store robotic position data representing the states and actions of the robotic system 210 during task performance. This state and action data can be fed into the policy generator 238 during policy development.

In some examples, for example as discussed with respect to FIG. 3 below, the data flow 270 can be implemented prior to deployment of the robotic system 210 for task performance in order to optimize its control policy 246. In some examples, for example as discussed with respect to FIG. 4 below, the data flow 270 can be implemented during deployment of the robotic system 210 for task performance in order to recalibrate its control policy 246.

Overview of Example Machine Learning Processes

Figure 3:
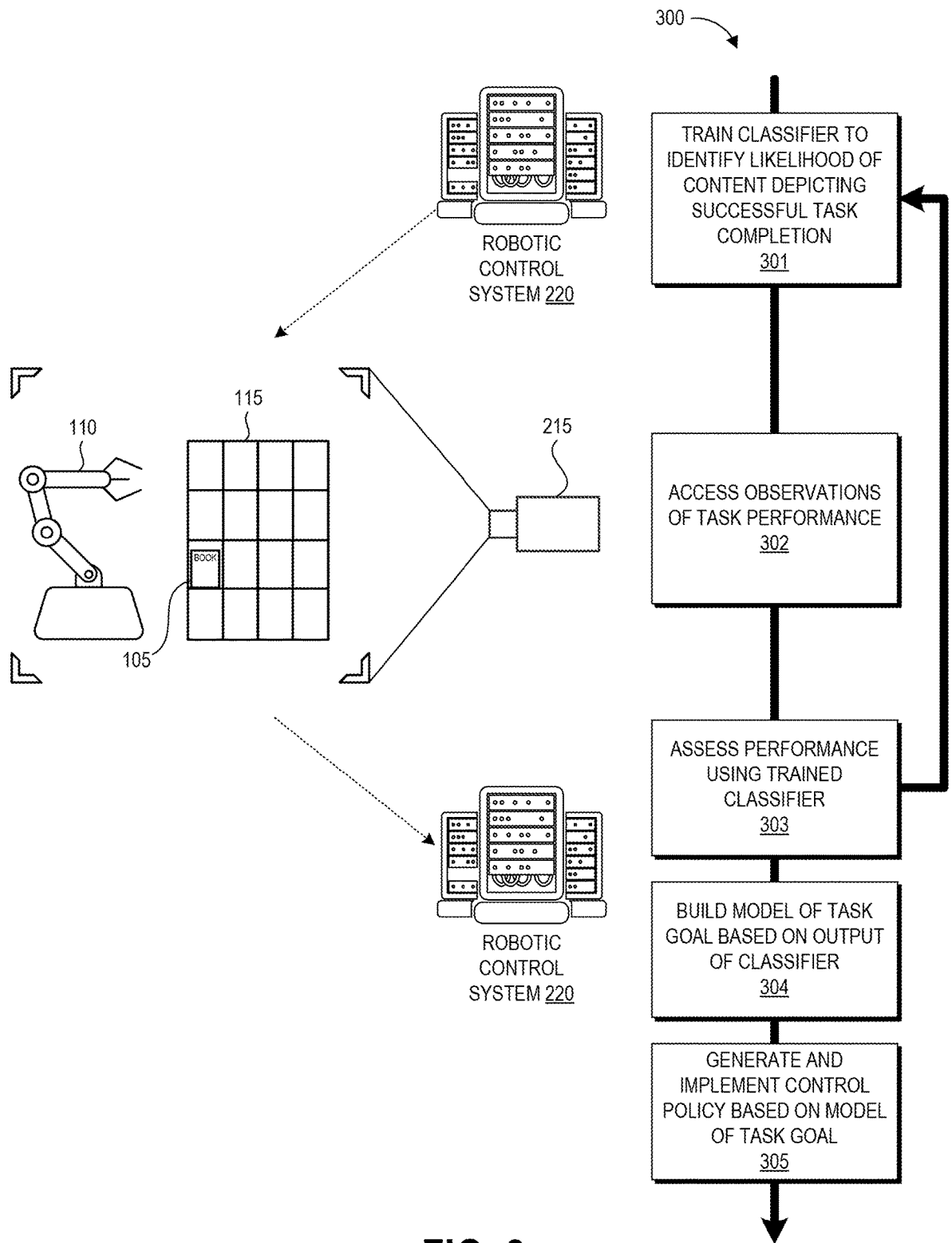
FIG. 3 is a flow diagram of an illustrative process for generating reward functions and control policies using the machine learning system of FIGS. 2A-2B according to some embodiments.

FIG. 3 is a flow diagram of an illustrative process 300 for generating reward functions for robotic policy generation using the robotic control system 220 of FIGS. 2A-2B or another suitable service according to some embodiments. Though particular blocks are described with respect to particular components of the robotic control system 220, it will be appreciated that the described functions could be performed in alternate embodiments by other suitable modules or components of the robotic control system 220.

The process 300 may begin in response to an event, such as on a predetermined or dynamically determined schedule, on demand when initiated by a system administer, or in response to some other event. For example, the process 300 may be initiated upon acquisition of a predetermined amount of training data, addition of a new robot and/or task to the robotic control system 220, or a change in a robot or task. When the process 300 is initiated, a set of executable program instructions stored on one or more non-transitory computer-readable media (e.g., hard drive, flash memory, removable media, etc.) may be loaded into memory (e.g., random access memory or "RAM") of a server or other computing device of the robotic control system 220. The executable instructions may then be executed by a hardware-based computer processor (e.g., a central processing unit or "CPU") of the computing device. In some embodiments, the process 300 or portions thereof may be implemented on multiple computing devices and/or multiple processors, serially or in parallel.

At block 301, the machine learning module 234 trains the parameters of the classifier to identify the likelihood of recorded observation content depicting successful task completion, or to assign a success value to a recorded observation, or to compare the relative level of success represented by two recorded observations. As described above, this can involve supervised or unsupervised training of one or more machine learning models based on training data. In some embodiments, a classifier may have already been trained for a particular task, and thus block 301 can involve accessing the trained classifier.

At block 302, the robotic system 110 performs a designated task, for example during the exploration and exploitation phase of determining its control policy. Also at block 302, the observation system 215 records data representing the task performance in one or more of the formats described herein, with such data representing one or more performances of a task by a particular robotic system 110. The recorded observations can involve the robotic system 110, its environment (e.g., including storage structure 115), and target object(s) of the task (e.g., book 105). In some embodiments, the recorded data may focus on the target object(s) at various points throughout the task without necessarily capturing data regarding the robotic system 110 and environment.

At block 303, the observation(s) recorded at block 302 are evaluated using the trained classifier 234. As described above with respect to FIGS. 1C and 1D, the classifier 234 may compare two (or more) recorded observations to determine which represents a higher degree of success at performance of the task, or may analyze a single recorded observation to output a success score. In some implementations, the output of block 303 can be added to the training data set used at block 301, and thus the process 300 may loop back to block 301 to re-train the classifier using this new training data.

At block 304, the reward predictor 236 builds a model of task based on the output of the classifier. As described above, this can be accomplished via machine learning, for example through Bayesian inference or a deep neural network. The resulting reward function can include a number of weighted parameters that influence the level of success achieved during task performance.

At block 305, the policy generator 238 can generate a control policy 246 that is used to control the robotic system 210 in future iterations of the task. In some embodiments, block 305 may be performed by a separate computing system that receives the reward function and/or trained classifier from the robotic control system 220. Further, as described above in some embodiments the classifier output can directly model a gradient reward, and block 304 may be omitted.

Figure 4:
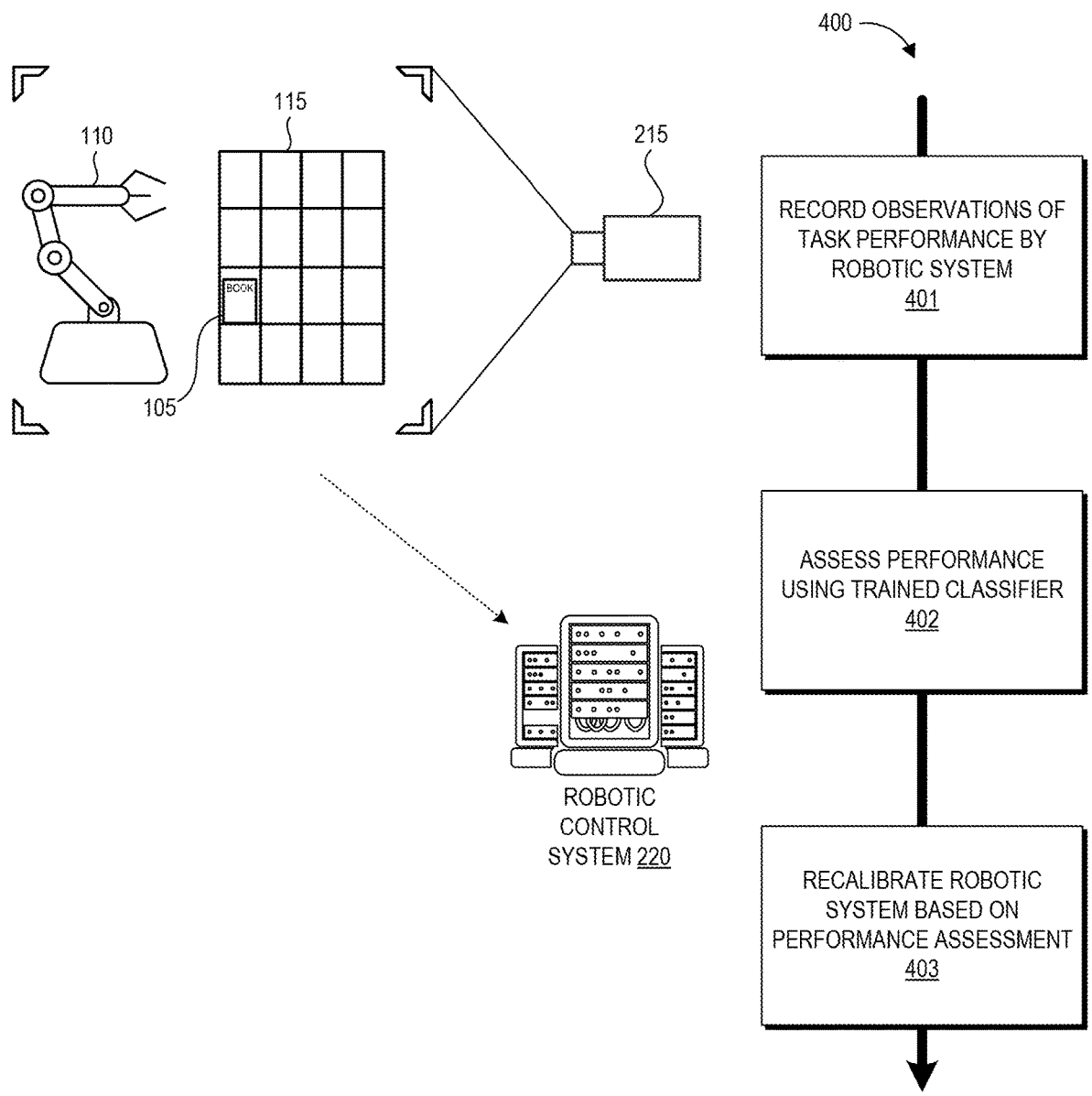
FIG. 4 is a flow diagram of a closed-loop robotic recalibration system using the machine learning system of FIGS. 2A-2B according to some embodiments.

FIG. 4 is a flow diagram of an illustrative process 400 for closed-loop robotic recalibration using the robotic control system 220 of FIGS. 2A-2B or another suitable service according to some embodiments. The process 400 beneficially enables robotic control system 220 to adapt to changing conditions of task performance such as wear on a robot or environmental changes. The process 400 may be used in regression testing in some embodiments, for example to verify that a previously generated control policy still performs the same way after a particular event or amount of passed time. In the virtual environment, the process 400 may enable a virtual agent to adapt to changing conditions as well, for example to enable a natural language artificial intelligence agent to adapt to changes in idioms and colloquial speech by users, or to enable a artificial intelligence agent participating in a game to adapt to changes to its virtual environment. Though particular blocks are described with respect to particular components of the robotic control system 220, it will be appreciated that the described functions could be performed in alternate embodiments by other suitable modules or components of the robotic control system 220.

The process 400 may begin in response to an event, such as on a predetermined or dynamically determined schedule, on demand when initiated by a system administer, or in response to some other event. For example, the process 400 can be initiated for a regression test. If the process 400 detects a problem with robotic performance it can fix the problem on the spot by recalibrating its policy. In some embodiments, the process 400 can begin when a particular robot begins or resumes operation at a task. In some embodiments, the process 400 can operate continuously with the robot as a pipeline for retraining and recalibrating its control parameters. When the process 400 is initiated, a set of executable program instructions stored on one or more non-transitory computer-readable media (e.g., hard drive, flash memory, removable media, etc.) may be loaded into memory (e.g., random access memory or "RAM") of a server or other computing device of the robotic control system 220. The executable instructions may then be executed by a hardware-based computer processor (e.g., a central processing unit or "CPU") of the computing device. In some embodiments, the process 400 or portions thereof may be implemented on multiple computing devices and/or multiple processors, serially or in parallel.

At block 401, the observation system 215 can record data in one or more of the formats described herein, with such data representing one or more performances of a task by a particular robotic system 110. As described above, the recorded observations can involve the robotic system 110, its environment (e.g., including storage structure 115), and target object(s) of the task (e.g., book 105). In some embodiments, the recorded data may focus on the target object(s) at various points throughout the task without necessarily capturing data regarding the robotic system 110 and environment.

At block 402, recorded observation can be provided to the trained machine learning classifier 234 for evaluation. As described above with respect to FIGS. 1C and 1D, the classifier 234 may compare two (or more) recorded observations to determine which represents a higher degree of success at performance of the task, or may analyze a single recorded observation to output a success score. Some embodiments of block 402 may involve outlier detection and/or trend analysis for a number of performances of the same task in order to determine whether the robotic system requires recalibration. Block 402 can involve determining, based on the result of the evaluation, whether to recalibrate the robotic system. For example, the robotic control system 220 can determine to recalibrate if a current observation is not preferred over a previous observation (or some predetermined number of previous observations), or if a current observation is determined to represent less than a threshold percentage or level of performance success.

At block 403, the reward predictor 236 and/or policy generator 238 can use the output of the classifier 234 to recalibrate the robotic system. In some examples, the classifier output can be used by the reward predictor 236 to refine the reward function 244, and the refined reward function 244 can be used by the policy generator 238 to refine the control policy 246. Further, the refined/recalibrated reward function can be output for use in generating policies for other robotic systems, which may have the same or different kinematics as the observed robotic system. In other examples, the classifier output can be provided as a gradient reward to the policy generator 238 and used to refine the control policy 246, As such, the performance of the robot 110 can be adjusted to optimize its success at its designated task without the need for a control engineer to reprogram the robot 110.

The dynamic recalibration process 400 can be repeated in real time as the robotic system 110 repeatedly performs the task or a sequences of tasks including the task. Real time refers to the process 400 being executed between the observed performance of the task and a next performance of the task, or between the observed performance of the task and a next performance after completion of the required processing. Beneficially, this enables a closed loop by which the robot can be automatically observed and recalibrated without requiring wait time for a control engineer to diagnose a performance problem and reprogram the robot 110 to overcome the problem.

Another advantage of the process 400 is that once the robot is consistently performing at a high level of success, recorded observations of its performance can be used to train the machine learning classifier (or a different machine learning classifier) to identify other examples of task success with greater precision. For example, after using the classifier (or human input) to identify that the recorded observations represent greater than a threshold degree of success at the task, the robotic control system 220 may determine to store these as examples of success in the training data repository. As such, when the outcome of block 402 (or multiple instances of block 402) indicates such performance, some embodiments of block 403 can involve using the recorded observation to update the parameters of the trained classifier or to train a classifier having a different architecture. The updated classifier can continue to be used in the process 400. The updated classifier or a different classifier trained based on the recorded observations may be used in the process 300 to generate the reward and/or train the policy of a different robotic system (which may have the same or a different configuration as the observed robot 110). Thus, in some embodiments block 403 of process 400 may be used as part or all of block 301 of process 300.

Terminology

Implementations disclosed herein provide systems, methods and apparatus for training and using machine learning models. The disclosed training and prediction models can be implemented in machine learning systems or artificial intelligence systems, including robotic systems performing specific tasks. As used herein, such systems include electronic memory storing computer-executable instructions for performing the described training and/or prediction operations and hardware processors that execute the instructions.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a graphics processing unit (GPU), a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a robotic system configured to perform a task according to a set of control parameters, the task comprising picking up and moving a particular type of physical object;
   an observation system positioned and configured to capture at least video data representing the robotic system performing the task, the video data comprising frames showing movement of a physical object of the particular type by the robotic system; and
   a robotic control system comprising one or more computing devices, the robotic control system programmed with executable instructions to at least:
      access a corpus of training videos depicting performances of the task;
      train a convolutional neural network to evaluate a level of success depicted in a given video of the task, wherein the convolutional neural network, during training, learns what pixel values, sequences of pixel values, or vector values in vector representations of the training videos, correspond to success at task performance, and generates weights that encode information about the pixel values, sequences of pixel values, or vector values corresponding to success at task performance;
      capture, using the observation system, a plurality of videos of the robotic system performing the task, each such video comprising frames showing movement by the robotic system of a physical object of the particular type;
      evaluate the plurality of videos using the convolutional neural network, wherein evaluating the plurality videos comprises using the weights of the convolutional neural network to generate data values representing preferences for particular videos over other videos, said data values specifying, for each of a plurality of pairs of the videos compared with the convolutional neural network, which video of the respective pair represents a higher level of success at performing the task;
      learn a reward function modeling success at performance of the task based at least partly on the data values generated by the convolutional neural network, wherein the reward function is configured to generate a reward value representing a level of success of task performance depicted in a video;
      generate, using a reinforcement learning system and the reward function, a policy comprising the set of control parameters; and
      upon the robotic system initiating a further performance of the task, control the robotic system using the policy to complete the further performance of the task.

2. The system of claim 1, wherein the observation system is further configured to capture additional recorded observations comprising one or both of sound and position sensor data, and wherein the robotic control system is programmed with the executable instructions to at least:
   train at least one component of a machine learning classifier to evaluate a level of success depicted in a given recorded observation, the machine learning classifier comprising the convolutional neural network and the at least one component;

capture, using the observation system, a plurality of recorded observations of the robotic system performing is the task, the plurality of recorded observations comprising the one or both of sound and position sensor data;

evaluate the plurality of recorded observations using the at least one component of the machine learning classifier to determine the level of success represented in the plurality of recorded observations; and learn the reward function based additionally on the determined level of success represented in the plurality of recorded observations.

3. The system of claim 1, wherein the robotic control system is programmed with the executable instructions to at least capture the plurality of videos of the robotic system performing the task during an exploration and exploitation phase.

4. The system of claim 1, wherein the robotic control system is programmed with the executable instructions to at least evaluate the plurality of videos by generating, for each video of the plurality of videos, a score representing the level of success depicted in the video.

5. The system of claim 1, wherein the robotic control system is programmed with the executable instructions to learn the reward function by a process that comprises optimizing parameters of the reward function to fit the data values generated by the convolutional neural network.

6. The system of claim 1, wherein machine learning training tasks and robotic control tasks are performed by separate computing devices of the robotic control system.

7. A computer-implemented method comprising, as performed by at least one computing device configured to execute specific instructions:

accessing a machine learning classifier trained to evaluate whether a recorded observation representing performance of a task depicts success at performing the task, the task comprising movement by a robotic system of a physical object of a particular type, the machine learning classifier comprising weights that encode information about what pixels, pixel values, or vector values in vector representations of videos, correspond to success at performance of the task;

accessing first and second recorded observations of robotic system performance of the task, the recorded observations comprising video frames showing movement of a physical object of the particular type;

comparing the first recorded observation to the second recorded observation using the machine learning classifier, wherein comparing the first and second recorded observations comprises applying the weights of the machine learning classifier to the first and second recorded observations and outputting an indication of which of said recorded observations depicts a higher level of success at performing the task;

determining a reward value based at least partly on a result of the comparison, the reward value representing a level of success at performance of the task;

generating, using a reinforcement learning system and the reward value, a policy for controlling the robotic system; and controlling operations of the robotic system performing the task using the policy.

8. The computer-implemented method of claim 7, further comprising building, using an additional machine learning model, a reward function to model parameters contributing to success at performing the task based on evaluating a plurality of recorded observations using the machine learning classifier, the reward function configured to generate reward values representing levels of success at performing the task.

9. The computer-implemented method of claim 8, further comprising building the reward function as a set of weighted parameters influencing success at performance of the task, the weighted parameters generated to fit comparisons performed by the machine learning classifier between recorded observations.

10. The computer-implemented method of claim 7, wherein evaluating the recorded observation comprises generating a score reflective of a level of success at performing the task that is represented by the recorded observation.

11. The computer-implemented method of claim 10, further comprising providing the score to the reinforcement learning system as a gradient reward.

12. A non-transitory computer storage medium storing executable code, wherein the executable code configures a computing system to perform a process comprising:

accessing a corpus of training data depicting performances of a task in which a robotic system moves a physical object;

training a machine learning classifier to evaluate success at performance of the task represented in the training data, wherein training the machine learning classifier comprises generating weights that encode information about pixel values, sequences of pixel values, or vector values in vector representations of videos, that correspond to success at performance of the task;

by the trained machine learning classifier, evaluating recorded observations of robotic performances of the task, wherein evaluating the recorded observations comprises using the weights to generate data values indicating, for each of a plurality of pairs of the recorded observations compared with the trained machine learning classifier, which recorded observation of the respective pair depicts a higher level of success at performing the task;

building, based at least partly on the data values generated by the trained machine learning classifier, a reward function to model parameters influencing success at performance of the task, the reward function configured to generate for a recorded observation a reward value representing a level of success at performance of the task; and providing the reward function to a reinforcement learning system configured to optimize a control policy for a robotic system designated to perform the task.

13. The non-transitory computer storage medium of claim 12, the process further comprising building the reward function using machine learning.

14. The non-transitory computer storage medium of claim 12, wherein evaluating the recorded observations comprises generating, for each recorded observation, a score reflective of a level of success at performance of the task depicted by the recorded observation.

15. The non-transitory computer storage medium of claim 12, wherein building the reward function comprises generating weighting parameters of the reward function to fit the reward function to comparisons performed by the trained machine learning classifier of recorded observations.

* * * * *